United States Patent
Sankar et al.

(10) Patent No.: US 10,795,894 B2
(45) Date of Patent: Oct. 6, 2020

(54) HYBRID FACET COUNTING USING DIFFERENT SAMPLING RATES

(71) Applicant: Microsoft Technology Licensing, LLC, Redmond, WA (US)

(72) Inventors: Sriram Sankar, Palo Alto, CA (US); Apurva Rajiv Mehta, Mountain View, CA (US); Dmytro Andriyovich Ivchenko, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 854 days.

(21) Appl. No.: 14/813,030

(22) Filed: Jul. 29, 2015

(65) Prior Publication Data

US 2017/0031912 A1 Feb. 2, 2017

(51) Int. Cl.
G06F 16/2457 (2019.01)
G06F 16/248 (2019.01)
(Continued)

(52) U.S. Cl.
CPC ...... *G06F 16/24578* (2019.01); *G06F 16/248* (2019.01); *G06F 16/954* (2019.01); *G06F 16/9535* (2019.01)

(58) Field of Classification Search
CPC ........... G06F 17/3053; G06F 17/30873; G06F 17/30867; G06F 17/30554; G06F 16/176;
(Continued)

(56) References Cited

U.S. PATENT DOCUMENTS 8,326,112 B2 * 12/2012 Sporer ................... G11B 27/10
348/512
2006/0184572 A1 8/2006 Meek et al.
(Continued)

FOREIGN PATENT DOCUMENTS

WO WO-2016032570 A1 3/2016
WO 2017019239 2/2017

OTHER PUBLICATIONS

"International Application Serial No. PCT/US2016/040040, International Preliminary Report on Patentability dated Feb. 8, 2018", 10 pgs.

(Continued)

*Primary Examiner* — Pierre M Vital
*Assistant Examiner* — Andalib F Lodhi
(74) *Attorney, Agent, or Firm* — Schwegman Lundberg & Woessner, P.A.

(57) ABSTRACT

In an example embodiment, a first set of results from first search results are displayed in a user interface. A plurality of facets, including selectable filters, of the first search results are displayed. A sampling scheme is retrieved, with the sampling scheme defining a first sampling rate for a first number of search results and a second sampling rate for a second number of search results. The first search results are traversed using the sampling scheme, sampling search results for the first number of search results at the first sampling rate and sampling search results for the second number of search results at the second sampling rate, for each sampled search result, causing an increase in a facet count for a facet and/or selectable filter having a matching value in the sampled search result. Facet counts for each of the facets and/or selectable filters are displayed in the user interface.

20 Claims, 10 Drawing Sheets

(51) Int. Cl.
 *G06F 16/9535* (2019.01)
 *G06F 16/954* (2019.01)
(58) Field of Classification Search
 CPC ............... G06F 16/1774; G06F 16/955; G06F
 11/1464; G06F 16/182; G06F 2201/84;
 G06F 16/24578; G06F 16/954; G06F
 16/9535; G06F 16/248; G06F 16/951;
 G06F 16/9032; G06F 16/338; G06F
 16/51; G06F 16/58; G06F 16/9038; G06F
 16/93; G06F 16/3331; G06F 16/735;
 G06F 16/335; G06F 16/90335; G06F
 16/9538; G06F 16/9566; H04L 67/1097;
 H04L 69/08
 See application file for complete search history.

(56) References Cited

U.S. PATENT DOCUMENTS

| | | | | |
|---|---|---|---|---|
| 2008/0243799 | A1* | 10/2008 | Rozich | G06F 3/0484 |
| 2009/0198675 | A1* | 8/2009 | Mihalik | G06F 3/0482 |
| 2009/0222412 | A1* | 9/2009 | Lee | G06F 17/30398 |
| 2012/0323905 | A1* | 12/2012 | Qiao | G06F 16/36 |
| | | | | 707/723 |
| 2013/0024440 | A1 | 1/2013 | Dimassimo et al. | |
| 2013/0226916 | A1 | 8/2013 | Dredze et al. | |
| 2013/0226940 | A1* | 8/2013 | Gorelik | G06F 17/30292 |
| | | | | 707/754 |
| 2014/0181086 | A1 | 6/2014 | Wable et al. | |
| 2014/0214838 | A1* | 7/2014 | Hendrey | G06F 16/285 |
| | | | | 707/737 |
| 2014/0258277 | A1 | 9/2014 | Cheng et al. | |
| 2015/0046443 | A1 | 2/2015 | Barkai et al. | |
| 2015/0254303 | A1* | 9/2015 | Saadat | G06F 16/2228 |
| | | | | 707/716 |
| 2016/0019304 | A1* | 1/2016 | Kim | G06F 16/338 |
| | | | | 707/722 |

OTHER PUBLICATIONS

"International Application Serial No. PCT/US2016/040040, International Search Report dated Sep. 22, 2016", 5 pgs.

"International Application Serial No. PCT/US2016/040040, Written Opinion dated Sep. 22, 2016", 8 pgs.

* cited by examiner

HYBRID FACET COUNTING USING DIFFERENT SAMPLING RATES

TECHNICAL FIELD

The present disclosure generally relates to the processing of searches performed in computer systems. More specifically, the present disclosure relates to a hybrid mechanism to allow for more efficient counting of facets in response to searches.

BACKGROUND

A faceted search is a type of search performed by users in a computer system. In a faceted search, dynamic filters are displayed in a user interface. These dynamic filters list different types of information (called facets) for the different results, as well as sample values corresponding to the types of information from the results. For example, if the data set being searched consists of user profiles, facets may be created for types of information such as location, current company, past company, relationship, location, industry, school, languages spoken, and the like. For each of these facets, actual values from the data set may be presented as selectable filters. Thus, for example, for location, there may be a selectable filter allowing the user to search on all locations, another selectable filter allowing the user to limit the search to just results in the United States, another selectable filter allowing the user to limit the search to just results in the United Kingdom, and so on, with the countries displayed being countries listed as locations in actual search results from the last query (e.g., Zaire will not be listed as a selectable fitter because there are no results in the last result set having a location of Zaire). The filters chosen to be displayed are commonly (but not always) the filters corresponding to the values having the most results in the result set. Thus, for example, the result set may include results from 300 different countries but the user interface may only have room to display five countries as selectable filters, and thus in most cases, the five countries listed in the most results in the result sets are chosen to be displayed. In some user interfaces, a facet count (of matching search results) for each facet and selectable filter can also be displayed.

DESCRIPTION OF THE DRAWINGS

Some embodiments of the technology are illustrated by way of example and not limitation in the figures of the accompanying drawings.

FIG. 4 is a screen capture illustrating a results display screen generated by a results display module, in accordance with an example embodiment.

FIG. 5 is a screen capture illustrating a results display screen generated by the results display module after a user selection, in accordance with an example embodiment.

DETAILED DESCRIPTION

Overview

Figure 1:
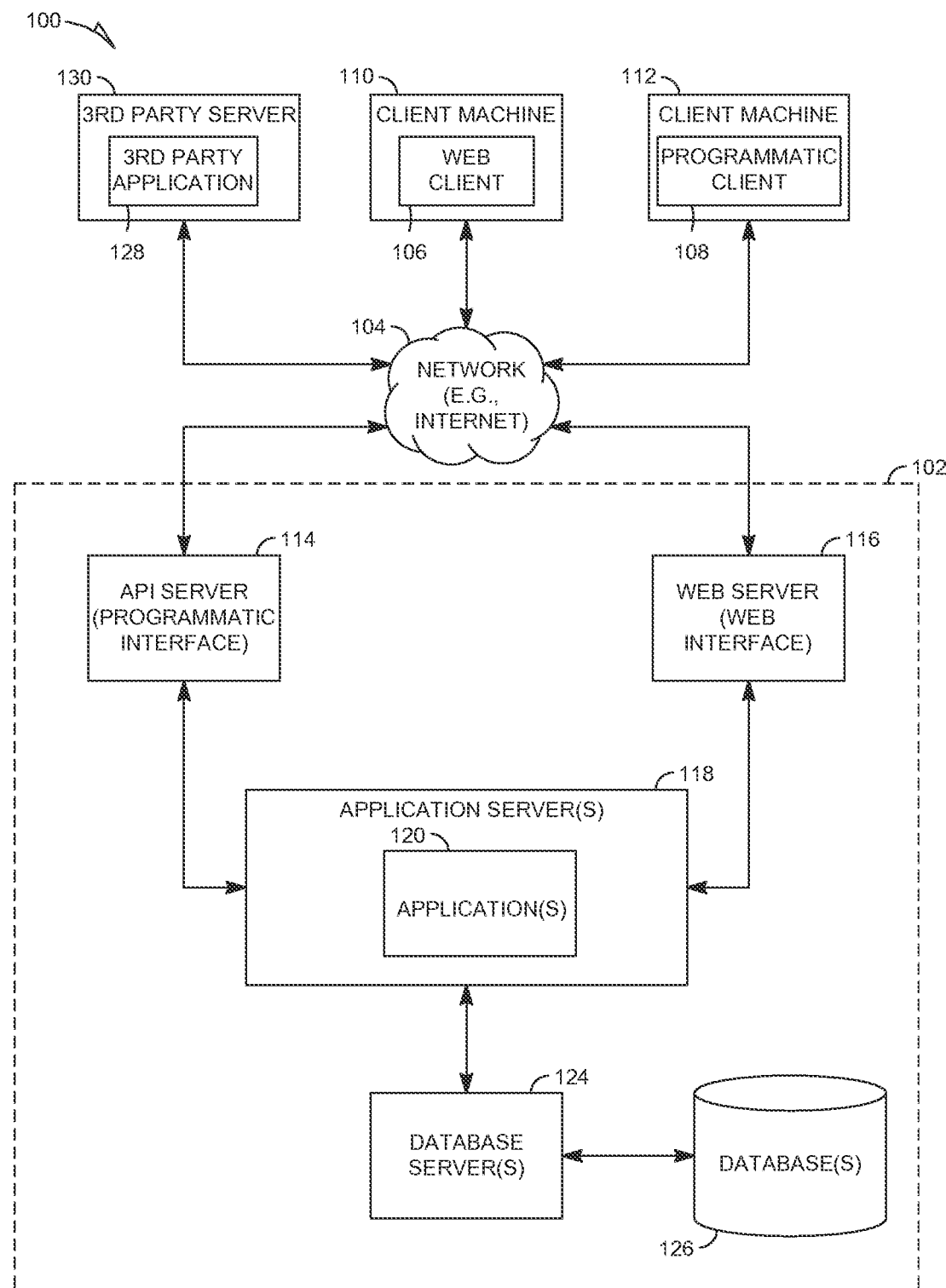
FIG. 1 is a block diagram illustrating a client-server system, in accordance with an example embodiment.

The present disclosure describes, among other things, methods, systems, and computer program products, which individually provide functionality for speeding data access. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

As result sets from queries grow larger, providing a facet count can become more complex and processor-intensive. In storing data used for search engines, it is common to utilize an inverted index data structure. An inverted index is an index that stores a listing of which documents/results contain particular words or terms. Part of the process of creating an inverted index is to create a forward index. A forward index is an index that stores a list of words or terms contained in each document. The forward index can then be sorted to transform it into an inverted index. The facets for each document are listed in the document's forward index. Therefore, in order to provide an accurate determination of whether or not a particular document should add to the "count" for a particular facet, the forward index of the document is traversed. It can take a great deal of computing power, therefore, to provide an accurate count for each facet as every forward index for every document in the result set would need to be traversed.

In an example embodiment, a hybrid approach to facet counting is performed where sampling is performed. First, the list of search results is sorted based on a relevance scheme. This relevance scheme may place, for example, results that have a high chance of matching relevant facets at the top of the list and results having a low chance of matching relevant facets at the bottom of the list. In one example embodiment, this relevance scheme may be based on how well a particular document (e.g., a member profile) has been curated. Curation generally involves the act of completing and updating a member profile. Thus, for example, a member profile with fields that have not been completed and/or that has not been updated in a long time may be viewed as not having been curated (or, at least having a low level of curation). Conversely, member profiles that have been completely filled out and/or updated frequently may be viewed as having a high level of curation. More generally, the relevance scheme may, in an example embodiment, cause the search results to be sorted such that higher ranked search results have a higher likelihood of being relevant, thus enabling sampling to occur at a more infrequent frequency as the search results are further and further traversed.

Once the list of search results has been sorted based on the relevance scheme, a step sampling scheme may be followed down the list. In an example embodiment, the step sampling scheme involves sampling a certain frequency of search results for a certain number of search results, then a lower frequency of search results for another number of search results, then an even lower frequency of search results for another number of search results, and so on. Thus, rather than sampling the entire data set at the same rate (e.g., one out of every 5 documents sampled), the sampling rate is biased towards the most relevant results (as produced by the aforementioned relevance scheme).

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more database 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112 and third party server machine 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
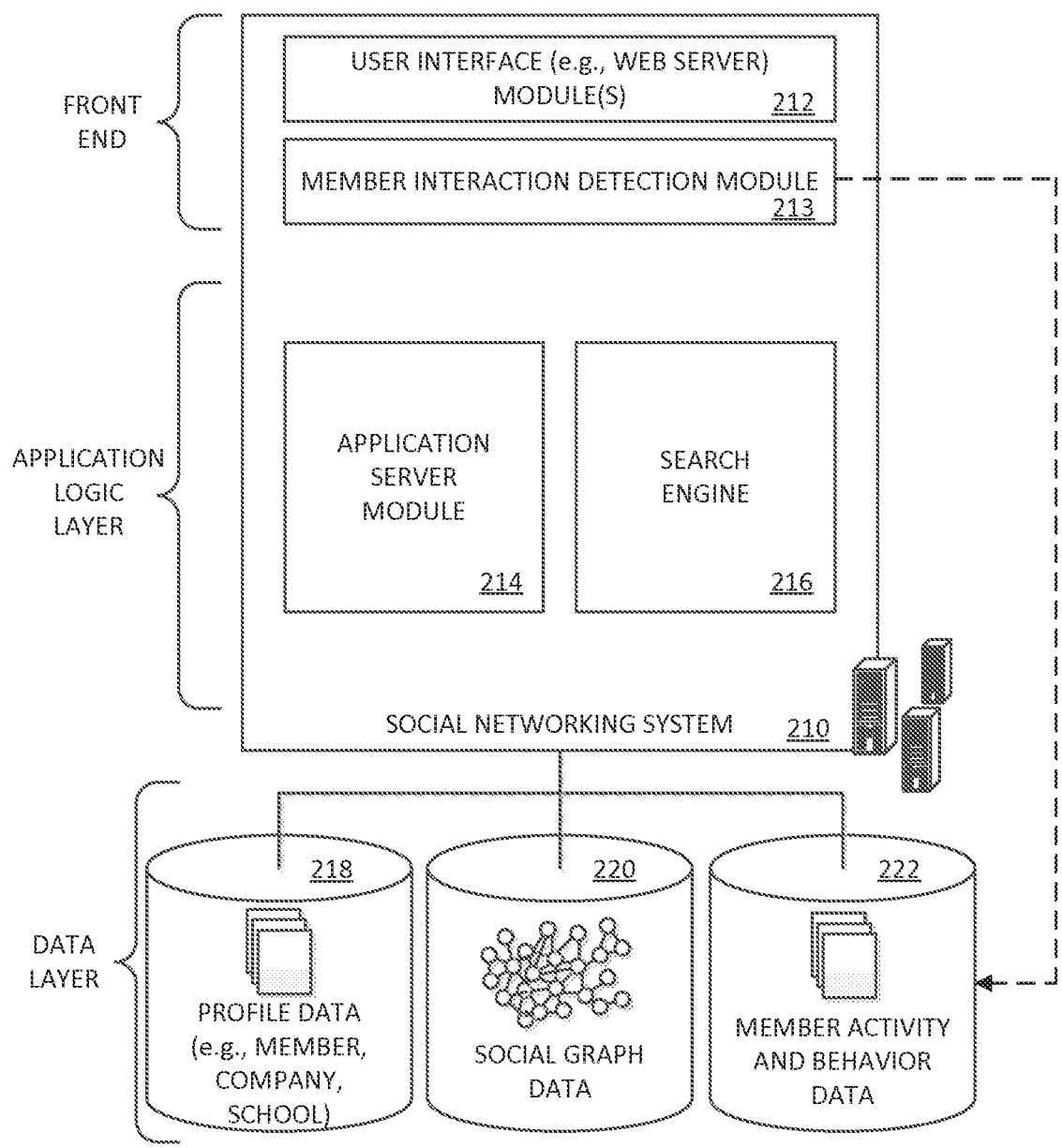
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social network service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on application server(s) 118 in FIG. 1. However, it is contemplated that other configurations are also within the scope of the present disclosure.

As shown in FIG. 2, a front end may comprise a user interface module (e.g., a web server) 212, which receives requests from various client computing devices and communicates appropriate responses to the requesting client devices. For example, the user interface module(s) 212 may receive requests in the form of Hypertext Transport Protocol (HTTP) requests, or other web-based, API requests. In addition, a member interaction and detection module 213 may be provided to detect various interactions that members have with different applications, services, and content presented. As shown in FIG. 2, upon detecting a particular interaction, the member interaction and detection module 213 logs the interaction, including the type of interaction and any meta-data relating to the interaction, in the member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service.

As shown in FIG. 2, a data layer may include several databases, such as a database 218 for storing profile data, including both member profile data as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). With some embodiments, the profile data may be processed (e.g., in the background or offline) to generate various derived profile data. For example, if a member has provided information about various job titles that the member has held with the same company or different companies, and for how tong, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social networking service. A "connection" may require a bilateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in the social graph database 220.

As members interact with the various applications, services and content made available via the social networking service, the members' interactions and behavior (e.g., content viewed, links or buttons selected, messages responded to, etc.) may be tracked and information concerning the member's activities and behavior may be logged or stored, for example, as indicated in FIG. 2, by the member activity and behavior database 222. This logged activity information may then be used by the search engine 216 to determine search results for a search query.

In some embodiments, databases 218, 220, and 222 may be incorporated into database(s) 126 in FIG. 1. However, other configurations are also within the scope of the present disclosure.

Although not shown, with some embodiments, the social networking system 210 provides an API module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when indexing member profiles, forward search indexes are created and stored. The search engine 216 facilitates the indexing and searching for content within the social network service, such as the indexing and searching for data or information contained in the data layer, such as profile data (stored, e.g., in database 218), social graph data (stored, e.g., in database 220), and member activity and behavior data (stored, e.g., in database 222). The search engine 216 may collect, parse, and/or store data in an index or other similar structure to facilitate the identification and retrieval of information in response to received queries for information. This may include, but is not limited to, forward search indexes, inverted indexes, N-gram indexes and so on.

Figure 3:
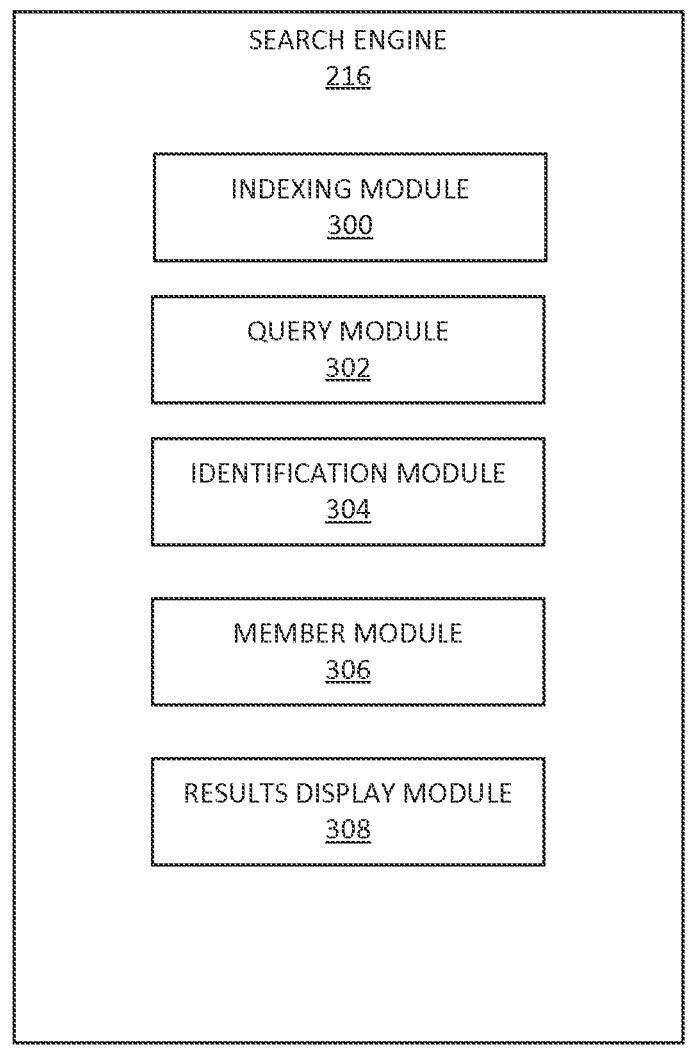
FIG. 3 is a block diagram illustrating a search engine, in accordance with an example embodiment, in more detail.

FIG. 3 is a block diagram illustrating the search engine 216, in accordance with an example embodiment, in more detail. As can be seen, the search engine 216 includes an indexing module 300. The indexing module 300 acts to index information from the social network. It should be noted that this indexing may occur either offline (e.g., performed periodically and not in response to a user query) or online (e.g., performed in real-time in response to a user query). As such, in some example embodiments, the indexing module 300 may be located outside of the search engine 216, either in lieu of or in addition to inside the search engine 216.

In some examples embodiments, a query module 302 is configured and/or programmed to receive and/or access a search query, such as a search query received by the search engine 216. The query module 302 may access a full query, such as a member name or company name (e.g., "Apple"), and/or a partial query, such as a string of characters that make up a partially input query (e. g., "A-P-P"). The query module 302 may receive and/or access a variety of different query types, including natural language queries, structure queries, and so on. Also, the query module 302 may receive and/or access queries of varying scopes, such as informational queries, navigational queries, transactional queries, connectivity queries, and so on.

In some example embodiments, an identification module 304 is configured and/or programmed to identify one or more categories of data that include information satisfying the received and/or accessed search query. The identification module 304 may identify, select, and/or determine two or more categories that include and/or contain information that satisfies a received query. For example, the identification module 304 may parse an index in order to identify categories of data that include information that satisfies a received query. The identification module 304 may determine that two or more categories of data include such information. For example, in response to a search query received by the search engine 216, the identification module 304 may identify a member database and a company database that both include information that satisfies the received query.

Example categories of information may include categories of information associated with people or members, categories of information associated with jobs, categories of information associated with companies, categories of information associated with news, categories of information associated with information posted to a social network, categories of information associated with schools and other organizations, categories of information associated with skills or attributes, and so on.

In some example embodiments, a member module 306 is configured and/or programmed to identify information associated with one or more members of a social network, such as member attribute information. For example, in response to receiving a search query from a member of the social network service, the member module 306 may identify and/or determine characteristics, attributes, activity information, social graph information, and other information associated with the member that provided the received search query.

In some example embodiments, a results display module 308 is configured and/or programmed to present and/or otherwise display the results of a search query.

Figure 4:
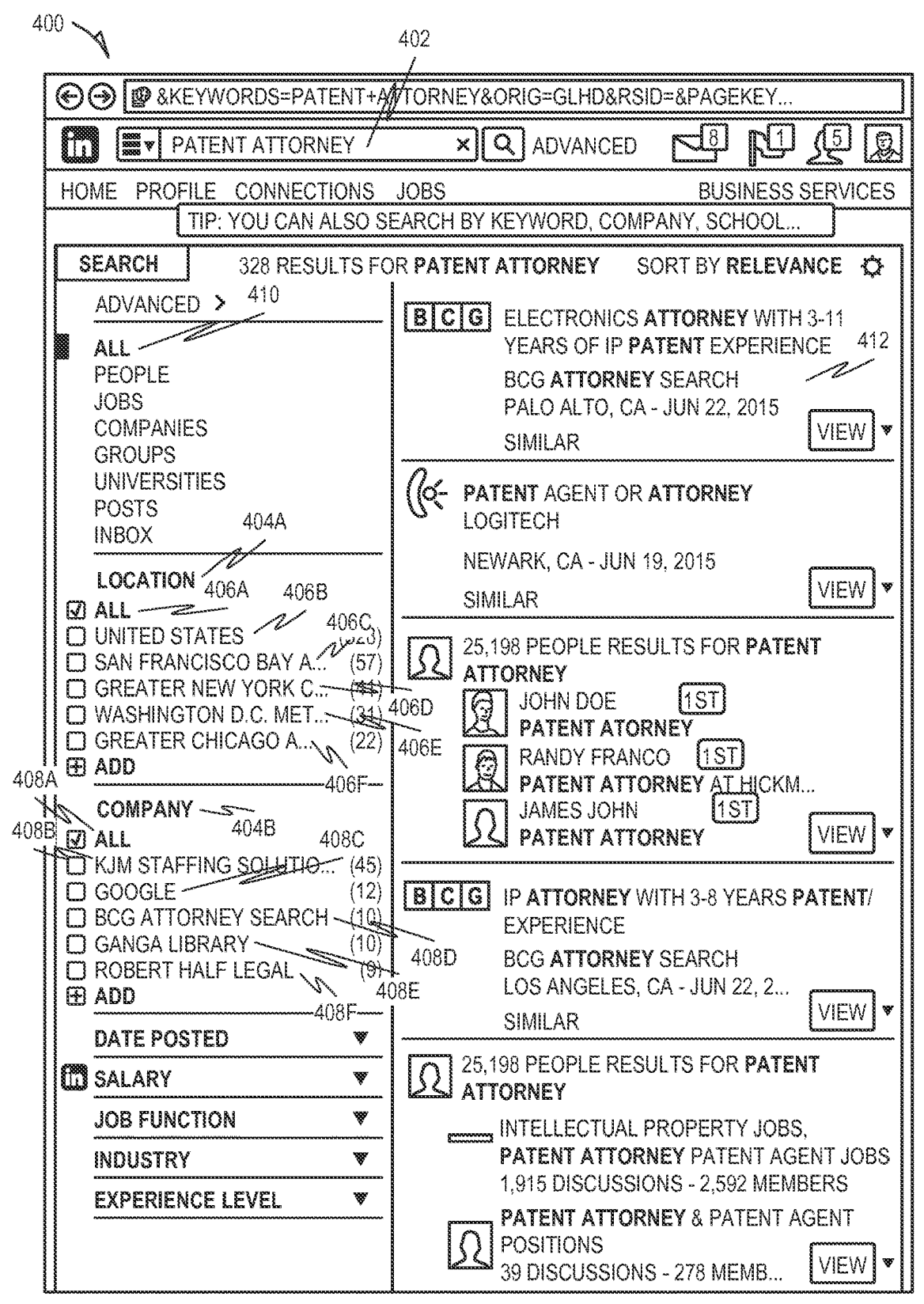

FIG. 4 is a screen capture illustrating a results display screen 400 generated by the results display module 308, in accordance with an example embodiment. A user enters a search query (here "patent attorney") in search box 402, which generates a search on member profiles and other data (such as job postings) in the social network and produces results. Facets 404A, 404B are provided allowing the user to select one or more filters 406A-406F, 408A-408F corresponding to each facet, which, when selected, act to fitter the results.

Here, the facets displayed are location 404A and company 404B. Currently the user has selected "all" as a general filter 410 (for result type), although it is also possible that the system has made this selection based on default settings and/or other processes to anticipate the desirable results in response to the search query. Thus, the results displayed in results area 412 are results of the types "people," "jobs," companies," and the like that match the search query "patent attorney." The user may further limit the search results to one of these types, or may select one or more of the selectable filters 406A-406F, 408A-408F to further restrict the search results. Notably, facet counts are provided next to each of the selectable filters 406A-406F, 408A-408F, indicating the number of results from the search results that match the particular filter. Thus, for example, of the total results, 57 correspond to "San Francisco Bay Area" as a location.

Figure 5:
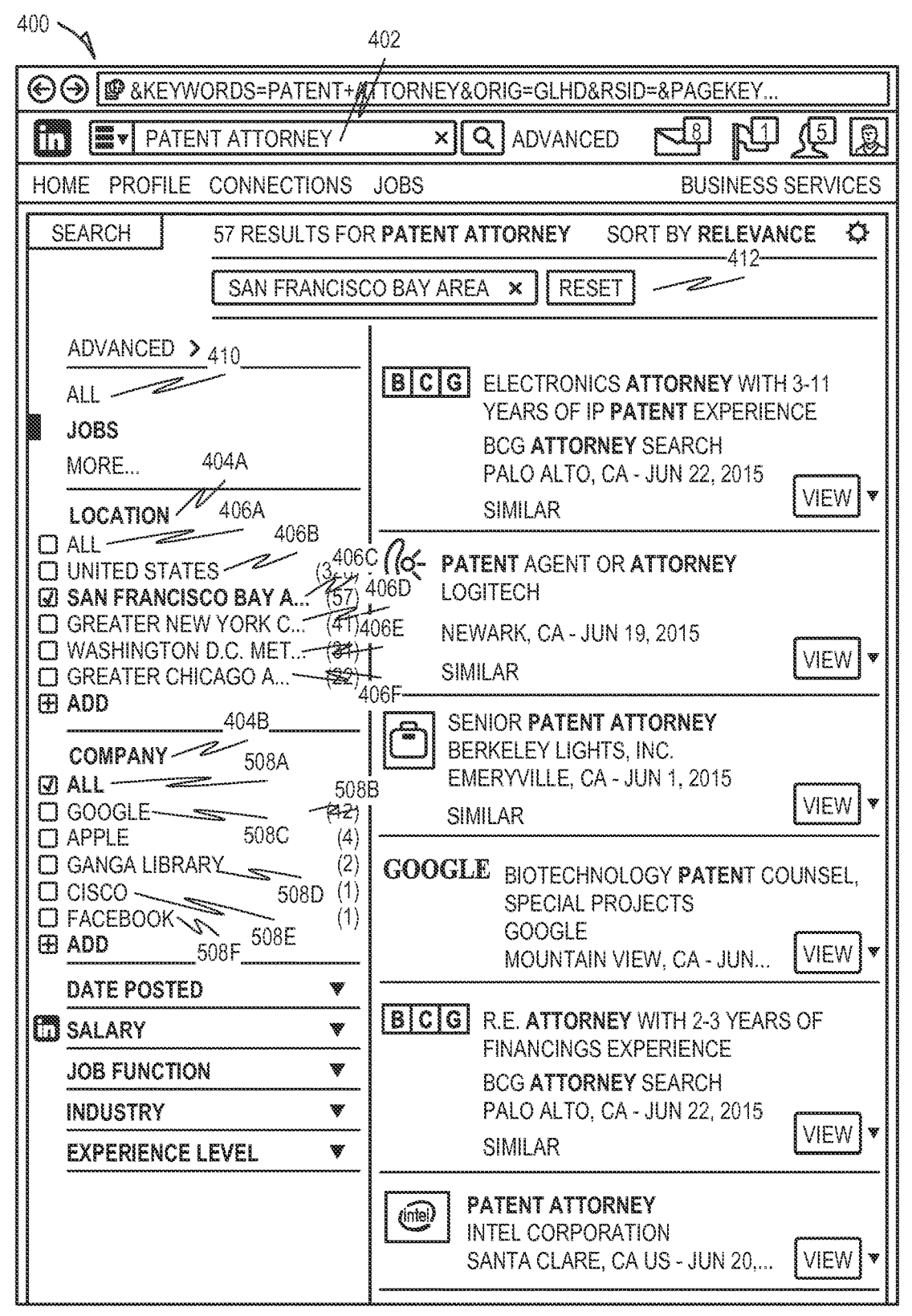

FIG. 5 is a screen capture illustrating a results display screen 400 generated by the results display module 308 after a user selection in accordance with an example embodiment. Here, the user has selected filter 406C, corresponding to a location of "San Francisco Bay Area." The overall result set has also been limited to "Jobs," either through user selection or via a determination by the system that the result set should be so limited. Notably, 57 results are listed in the results area 412, all of which match a location of "San Francisco Bay Area." Also notably, the facet counts for the selectable filters and the choice of selectable filters themselves) 408A-408F for the "other" facet (any facet not having a selected filter, here facet 404B corresponding to company) are also dynamically updated. Thus, while "KJM" Staffing solutions 408B may have been a selectable filter corresponding to the most matching results in the results set of FIG. 4 (corresponding to all geographic areas), in FIG. 5, due to the users selection of the selectable filter 4069, only the companies corresponding to results in the results set having a location of San Francisco Bay Area are used in figuring out which selectable filters 508A-508F are displayed under facet 404B in FIG. 5, and thus "Google" now represents the top selectable filter 508A, with an updated facet count showing 12 results in the result set for San Francisco Bay Area jobs. Thus, as can be seen, the user's selection of one or more individual selectable filters 406A-406F, 408A-408F, 508A-508F causes not just a dynamic update of the results set displayed in result area 412 but also a dynamic update of the facets 404A-404B, selectable filters 406A-404F, 408A-408F, and 508A-508F, and corresponding facet counts.

Figure 6:
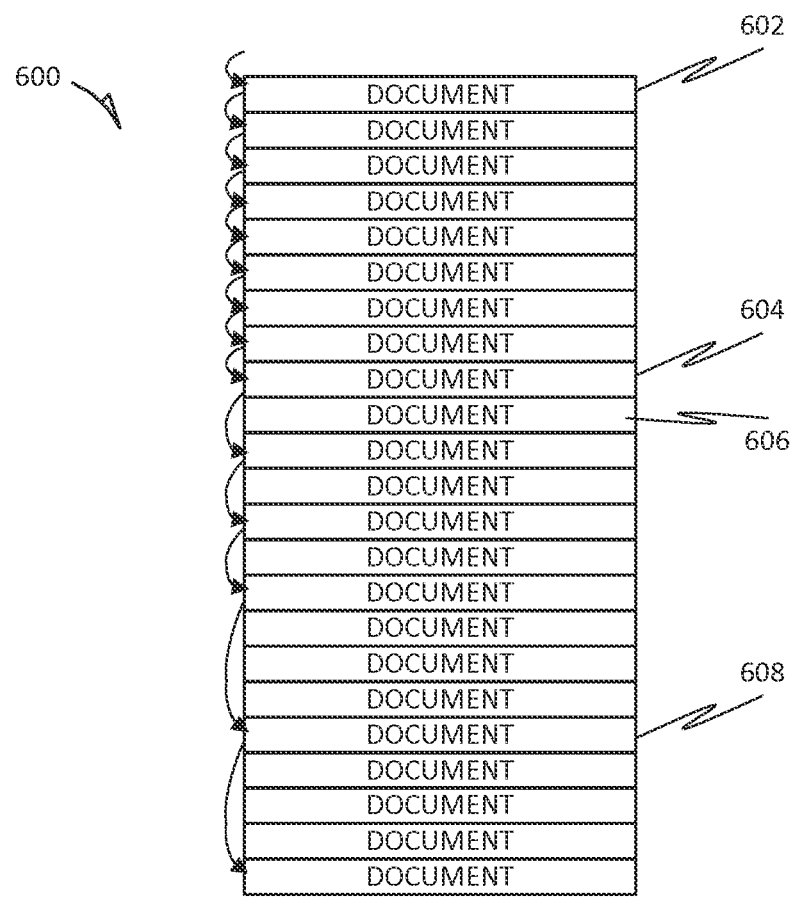
FIG. 6 is a diagram illustrating a sampling scheme, in accordance with this example embodiment.

In an example embodiment, a sampling scheme is used that samples every document for X number of documents sampled, then samples every second document for another X number of documents, then samples every fourth document for another X number of documents, and so on, decreasing the sampling frequency exponentially each number of X documents traversed. FIG. 6 is a diagram illustrating a sampling scheme, in accordance with this example embodiment. Here, a sorted result list 600 is traversed as described above. Here, for simplicity, 8 is selected as X, although in real-world examples this number would likely be much larger. Thus, as can be seen, the first eight documents are sampled without skipping. The next 8 documents sampled are selected by skipping every other document (thus sampling every second document). Thus, of the next 8 documents, only 4 are actually sampled. The next 8 documents sampled are selected by only selecting one out of every four documents. Thus, of the next 8 documents, only 2 are actually sampled. The next 8 documents sampled are selected by only selecting one out of every eight documents. Thus, of the next 8 documents, only 1 is actually sampled.

For each document sampled, any necessary facet counting is performed. Thus, for example, document 602 is selected to be sampled by the above-described sampling scheme. Thus, if there is any facet or selectable filter that needs a corresponding facet count, this particular document 602 will be used to increase the facet count. While in the first set of sampled documents no document is skipped, this distinction becomes more relevant in subsequent sets when some documents in the sorted result list 600 are skipped. For example, document 604 is sampled while document 606 is not sampled. The result is that document 604 is used to increase the facet count for all facets and selectable filters relating to the document 604, while document 606 is ignored.

An accurate facet count is maintained by weighting the increase in facet count based on the sampling frequency when the corresponding document was encountered. Thus, for example, if document 604 has a location of San Francisco Bay Area then when document 604 is encountered, the facet count for the "San Francisco Bay Area" selectable filter is increased by two (1×2 because the sampling frequency at that stage is ½). Likewise, if document 608 has a location of San Francisco Bay Area, then when document 608 is encountered, the facet count for the "San Francisco Bay Area" selectable filter is increased by four (1×4 because the sampling frequency at that stage is ¼). For each sampled document, the count for other facets and selectable filters can be counted in a similar fashion, but notably no facet count for any facet is affected by document 606, which is ignored and not sampled.

It should be noted that there is no requirement that the distance between samples (X) be fixed for the length of the sampling scheme. Embodiments are possible where X is altered as the results list is traversed. For example, a first leg of the sampling scheme may involve sampling every document for 20 documents sampled, while a second leg may involve sampling every other document for 15 documents sampled, while a third leg may involve sampling every fourth document for 10 documents sampled.

In addition to determining how to sample, as described above with respect to the sampling scheme, in an example embodiment, a determination is made as to when sampling occurs. In other words, a determination is made as to which contexts the sampling scheme is run in, in contrast to, for example, a straight count of all documents without sampling, or simply not needing an updated count at all.

In an example embodiment, a set of facet rules define when and in what context sampling occurs. In one example facet rule, counting of any sort (either by sampling or by counting each document) only occurs for facets or selectable filters relating to facets other than a facet or selectable filter relating to a facet actually selected by a user. An example of this is described above with respect to FIGS. 4-5, where the fact that the user selected the selectable filter 406B for "San Francisco Bay Area," which is related to the "Location" facet 404A, causes counting to be performed for facet 404B and all of its corresponding selectable fitters 408A-408F, which may be re-ranked and tittered into selectable fitters 508A-508F. This counting is only performed on documents that match the initial search query and the selected filters (here selectable titter 406B). Thus, for example, the count next to Google 508B for facet 404B reflects how many of the documents matching the original search and that also correspond to the San Francisco Bay Area location additionally correspond to the Google company.

In another example facet rule, when it is determined that a particular facet or selectable filter requires a facet count, a determination is made as to whether to utilize the sampling scheme, such as the sampling scheme described above, or to perform a straight count. There may be certain instances where sampling is considered unreliable, such as with small counts. For example, white estimating the number of documents matching "Google" via sampling may be fine when the number of matching results is on the order of 1000 matches (say, sampling will estimate that there are between 990 and 1050 matches), that margin of error may be too great when the number of matching results in on the order of 10 matches (where sampling might estimate that there are between 5 and 15 matches, which is simply not precise enough for most user purposes). As such, the facet rule may specify a threshold facet count that, if transgressed, causes the sampling scheme to be executed but, if not transgressed, causes a straight count to be performed.

In the case where there are no selections of facets or selectable filters, the resulting query will look like:

```
+ Q
+((?Q' ? UU'1 ... ?UU'u)
``` where Q is the query condition, Q' is a sampling iterator for a query condition, UU'k is a disjunction of all conjunctions of all unselected iterators (corresponding to each facet value) with corresponding sampling iterators for a facet k, and u is the number of facets without selections, and ? means disjunctions and + means conjunction In the case where there is a single selection of a facet or selectable filter, the resulting query will look like:

```
+Q
+(
?(+S1 +(?Q' ?UU'2 ... ?UU'u+1))
?SS'1
?UU'1
)
``` where Q is the query condition, Q' is a sampling iterator for a query condition, Sk is the disjunction of all selected values for a facet k, SS'k is the disjunction of all selected facet values conjoined with their sampling iterators for facet value k which has selections, UU'k is a disjunction of all conjunctions of all unselected iterators with corresponding sampling iterators for a facet k, and u is the number of facets without selections.

In the case where there are two or more facets with selections, the resulting query will look like:

```
+Q
+(
?(
+S1 ... +Ss
+(
?Q'
?S'1 ... ?S's
?UU's+1 ... ?UU's+u
)
)
?( +S2 ... +Ss
+UU'1
)
...
?(
+S1 ... +Ss−1
+UU's
)
``` where Q is the query condition, Q' is a sampling iterator for a query condition, Sk is the disjunction of all selected values for a facet k, SS'k is the disjunction of all selected facet values conjoined with their sampling iterators for facet value k which has selections, UU'k is a disjunction of all conjunctions of all unselected iterators with corresponding sampling iterators for a facet k, s is the number of facets with selections, and u is the number of facets without selections.

Figure 7:
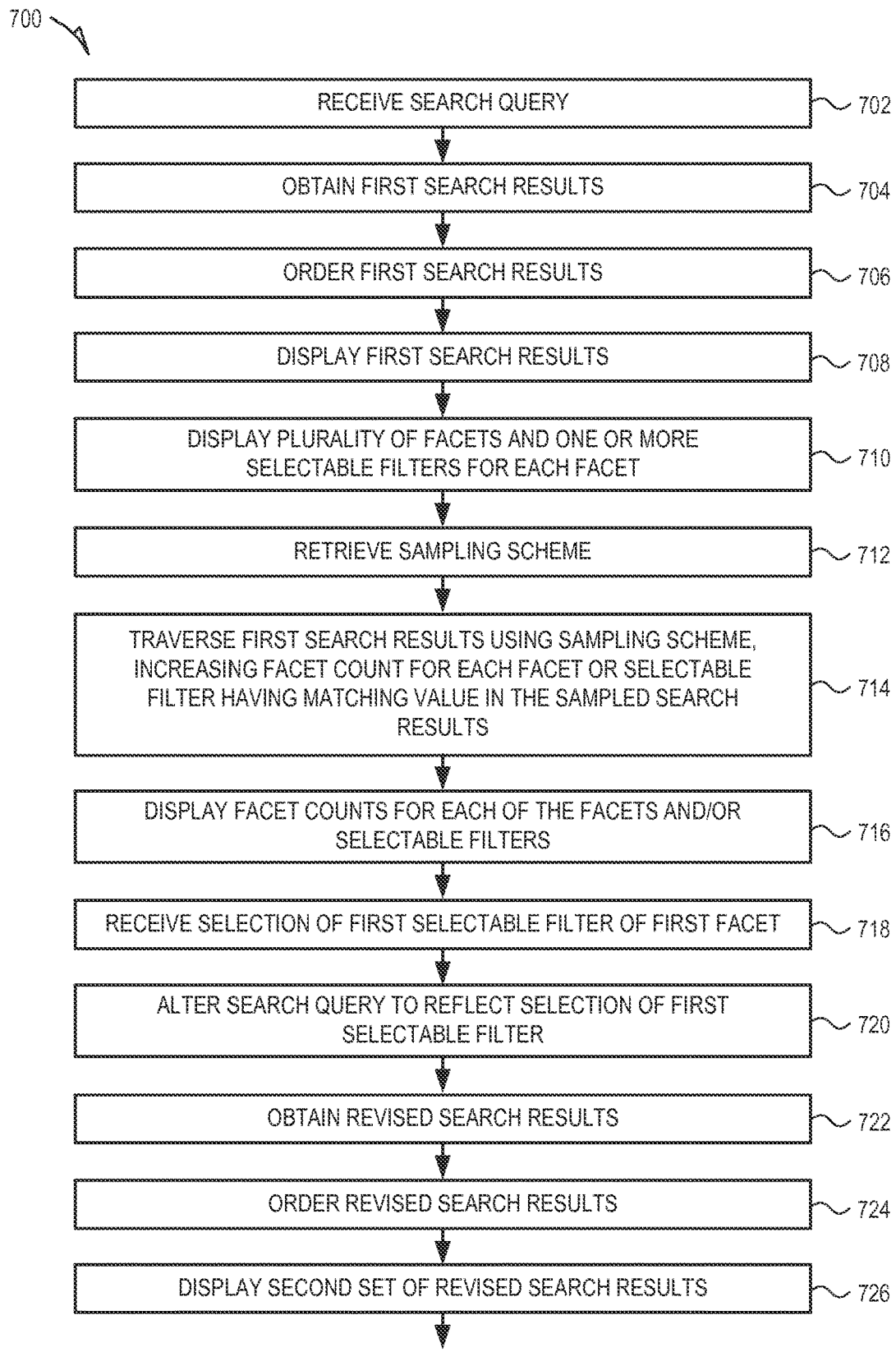
FIG. 7 is a flow diagram illustrating a method for facet counting, in accordance with an example embodiment.
Figure 7:
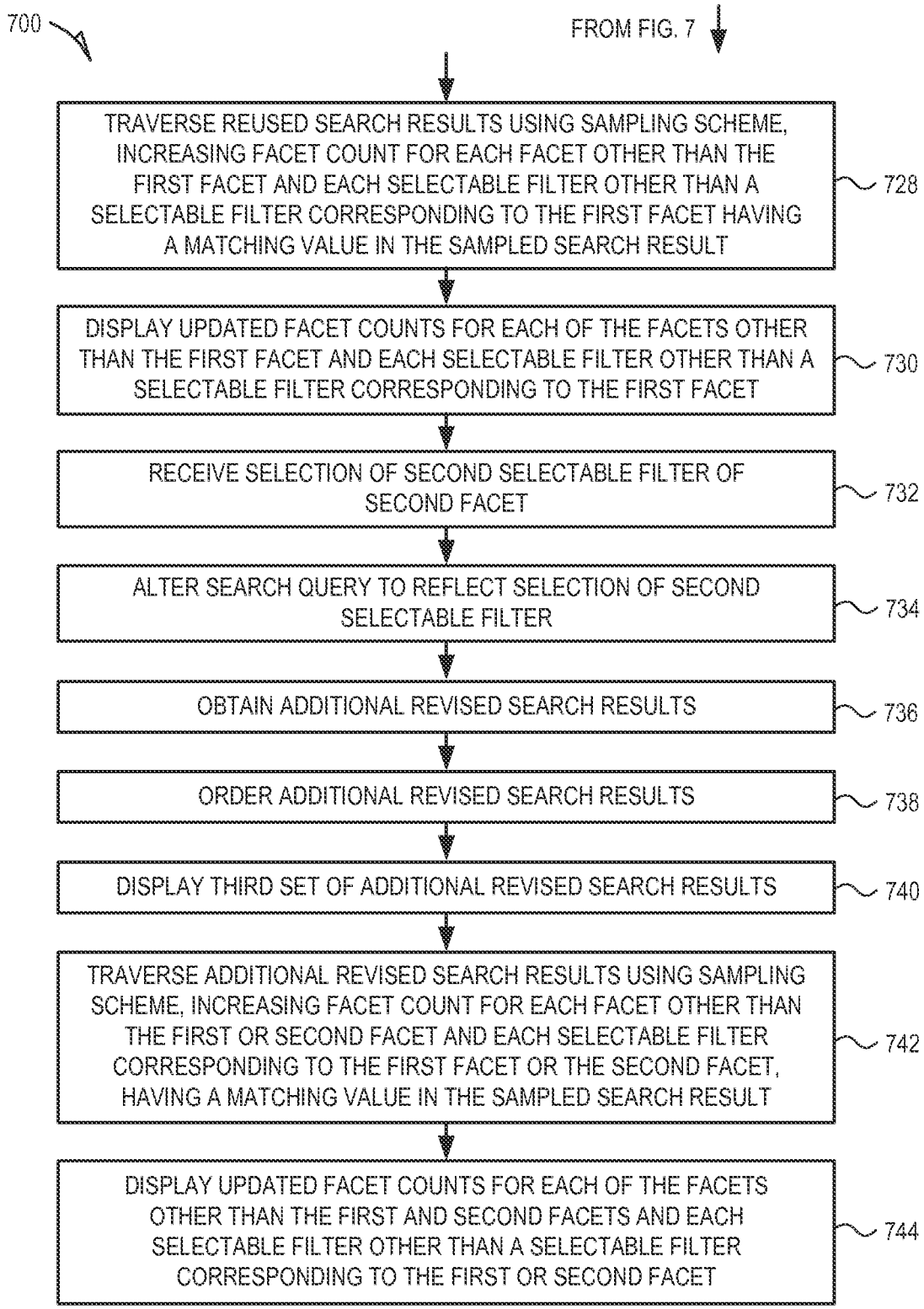

FIG. 7 is a flow diagram illustrating a method 700 for facet counting in accordance with an example embodiment. At operation 702, a search query is received. At operation 704, first search results to the search query are obtained from a database. This may be performed by, for example, submitting the search query to a search engine designed to retrieve documents in response to the search query. In one example embodiment, these documents are member profiles of a social networking service, in another example embodiment, these documents are job profiles in a social networking service.

Each of the search results may contain various pieces of information. In an example embodiment, a search result may contain a value for one or more facets. For example, if the facet is location, the search result may contain a piece of information identifying the location (such as "Mountain View, Calif."). The facets themselves could either be explicitly provided by a developer or may be deduced via comparison of the search results to various computerized templates or rules.

At operation 706, the first search results are ordered based on a relevance scheme. At operation 708, a first set of the first search results may be displayed in the user interface. This may be performed by, for example, identifying relevance scores for each of the search results and selecting a preset number of the first search results having the highest relevance score. In some example embodiments, this aspect may be performed by the search engine.

At operation 710, a plurality of facets of the first search results are displayed, along with one or more selectable filters for each facet. Each selectable filter corresponds to a different value for the corresponding facet.

At operation 712, a sampling scheme is retrieved. This sampling scheme defines a first sampling rate for a first number of search results and a second sampling rate for a second number of search results. The sampling rate is the ratio of sampled search results to search results traversed. Thus, a sampling rate of ¼, for example, corresponds to one sampled search result out of every four search results.

At operation 714, the first search results are traversed using the sampling scheme. This results in sampling search results for the first number of search results at the first sampling rate and sampling search results for the second number of search results at the second sampling rate, with each sampled search result causing an increase in a facet count for a facet and/or selectable filter having a matching value in the sampled search result, it should be noted that while a sampling scheme with only two different sampling rates is described here, in an example embodiment, any number of different sampling rates may be specified by the sampling scheme (and used for the traversing in operation 712).

At operation 716, facet counts for each of the facets and/or selectable filters is displayed.

At operation 718, a selection of a first selectable filter of a first facet is received. This may be indicated by, for example, a checkbox corresponding to the first selectable filter being selected in the user interface. At operation 720, the search query is altered to reflect the selection of the first selectable filter. At operation 722, revised search results to the altered search query are obtained from the database. It should be noted that in some example embodiments, the revised search results are actually obtained by narrowing down the first search results as opposed to requiring a separate call to the database. At operation 724, the revised search results are ordered based on the relevance scheme. At operation 726, a second set of results from the revised search results is displayed. As with the first set of results, the second set may be selected based on a relevance score for each search result.

It should be noted that while the above describes selection of facets as sequential, in some example embodiments counting and sampling for all facets can be performed during a single pass. This acts to reduce the number of requests that need to be issued, which reducing processing time/complexity.

At operation 728, the revised search results are traversed using the sampling scheme. As with the first traversal, this traversal results in sampling search results for the first number of search results at the first sampling rate and sampling search results for the second number of search results at a second sampling rate. Here, however, an increase in facet count is only caused for facets other than the first facet or for selectable filters corresponding to facets other than the first facet, assuming a matching value is found in the sampled search result.

At operation 730, updated facet counts for each of the facets and/or selectable filters, other than the first facet and selectable filters corresponding to the first facet, are displayed.

At operation 732, a selection of a second selectable filter of a second facet is received. This may be indicated by, for example, a checkbox corresponding to the second selectable filter being selected in the user interface. At operation 734, the search query is altered to reflect the selection of the second selectable filter. At operation 736, additional revised search results to the altered search query are obtained from the database. It should be noted that in some example embodiments, the additional revised search results are actually obtained by narrowing down the revised search results as opposed to requiring a separate call to the database. At operation 738, the additional revised search results are ordered based on the relevance scheme. At operation 740, a third set of results from the additional revised search results is displayed. As with the first and second sets of results, the third set may be selected based on a relevance score for each search result.

At operation 742, the additional revised search results are traversed using the sampling scheme. As with the first and second traversals, this traversal results in sampling search results for the first number of search results at the first sampling rate and sampling search results for the second number of search results at a second sampling rate. Here, however, an increase in facet count is only caused for facets other than the first facet or second facet or for selectable filters corresponding to facets other than the first facet or second facet, assuming a matching value is found in the sampled search result.

At operation 744, updated facet counts for each of the facets and/or selectable filters, other than the first facet or second facet and selectable filters corresponding to the first facet or second facet, are displayed.

Example Mobile Device

Figure 8:
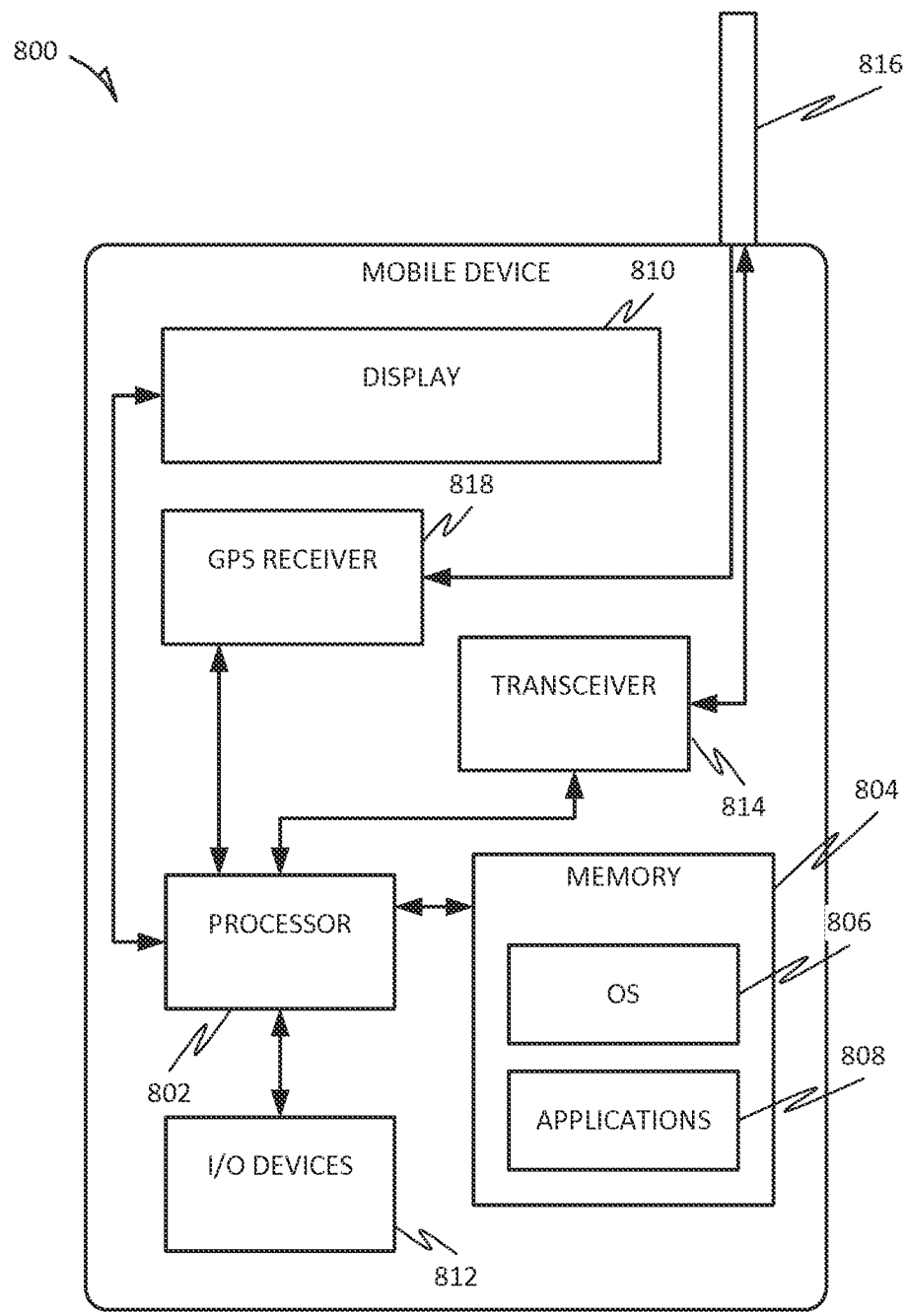
FIG. 8 is a block diagram illustrating a mobile device, according to an example embodiment.

FIG. 8 is a block diagram illustrating a mobile device 800, according to an example embodiment. The mobile device 800 can include a processor 802. The processor 802 can be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or another type of memory, is typically accessible to the processor 802. The memory 804 can be adapted to store an operating system (OS) 806, as well as application programs 808. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a Global Positioning System (GPS) receiver 818 can also make use of the antenna 816 to receive GPS signals.

Modules, Components, and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems e.g., a standalone, client, or server computer system) or one or more processors 802 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 802 or other programmable processor 802) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hard ware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 802 configured using software, the general-purpose processor 802 can be configured as different hardware-implemented modules at different times. Software can accordingly configure a processor 802, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 802 that are temporarily configured (e.g., by software) or permanently configured to perform the relevant operations. Whether temporarily or permanently configured, such processors 802 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors 802 or processor-implemented modules. The performance of certain of the operations can be distributed among the one or more processors 802, not only residing within a single machine, but deployed across a number of machines. In some example embodiments, the processor 802 or processors 802 can be located in a single location (e.g., within a home environment, an office environment, or a server farm), while in other embodiments, the processors 802 can be distributed across a number of locations.

The one or more processors 802 can also operate to support performance of the relevant operations in a "cloud computing" environment or as a "software as a service" (SaaS). For example, at least some of the operations can be performed by a group of computers (as examples of machines including processors 802), these operations being accessible via a network (e.g., the Internet) and via one or more appropriate interfaces (e.g., APIs).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 802, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 802 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 802), or in a combination of permanently and temporarily configured hardware can be a design choice. Below are set out hardware (e.g., machine) and software architectures that can be deployed, in various example embodiments.

Example Machine Architecture and Machine-Readable Medium

Figure 9:
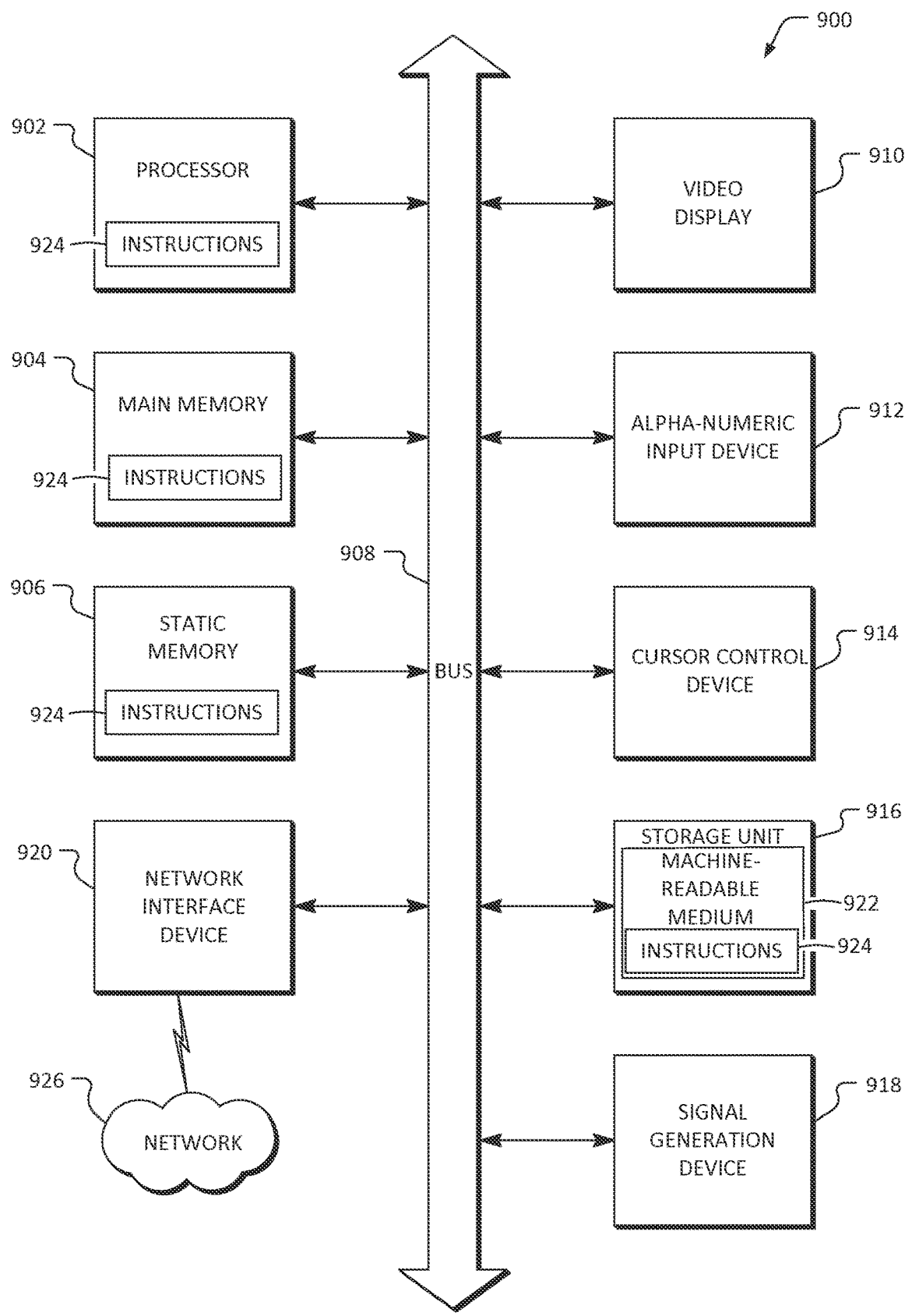
FIG. 9 is a block diagram of machine in the example form of a computer system within which instructions can be executed for causing the machine to perform any one or more of the methodologies discussed herein.

FIG. 9 is a block diagram of machine in the example form of a computer system 900 within which instructions 924 can be executed for causing the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions 924 to perform any one or more of the methodologies discussed herein.

The example computer system 900 includes a processor 902 (e.g., a CPU, a graphics processing unit (GPU), or both), a main memory 904 and a static memory 906, which communicate with each other via a bus 908. The computer system 900 can further include a video display 910 (e.g., a liquid crystal display (LCD) or a cathode ray tube (CRT)). The computer system 900 also includes an alphanumeric input device 912 (e.g., a keyboard or a touch-sensitive display screen), a cursor control device 914 (e.g., a mouse), a storage unit 916, a signal generation device 918 (e.g., a speaker), and a network interface device 920.

Machine-Readable Medium

The storage unit 916 includes a machine-readable medium 922 on which is stored one or more sets of instructions 924 (e.g., software) embodying or utilized by any one or more of the methodologies or functions described herein. The instructions 924 can also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" can include a single medium or multiple media (e.g., a centralized or distributed database, and/or associated caches and servers) that store the one or more instructions 924 or data structures. The term "machine-readable medium" shalt also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 can further be transmitted or received over a communications network 926 using a transmission medium. The instructions 924 can be transmitted using the network interface device 920 and any one of a number of well-known transfer protocols (e.g., HTTP). Examples of communications networks include a local area network (LAN), a WAN, the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
receiving, via a user interface, a search query;
obtaining first search results to the search query from a database;
displaying, in the user interface, a first set of results from the first search results;
displaying, in the user interface, a plurality of facets of the first search results, each facet including one or more selectable filters, each facet corresponding to a different type of information in the first search results, and each selectable filter corresponding to a particular value for a type of information corresponding to its facet;
retrieving a sampling scheme, the sampling scheme defining a first sampling rate for a first quantity of a single set of search results and a second sampling rate for a second quantity of the single set of search results, the first sampling rate defining a first frequency at which search results are sampled and the second sampling rate defining a second frequency, different that the first frequency, at which search results are sampled, wherein sampling involves examining some search results in a given quantity while ignoring other search results in the given quantity;
for a first quantity of the first search results, sampling the first quantity of the first search results at the first sampling rate, thereby examining some search results in the first quantity while ignoring other search results in the first quantity, and for each examined search result in the first quantity, causing an increase in a first facet count for a facet and/or selectable filter having a matching value in the examined search result in the first quantity of the first search results;

increasing the first facet count for the facet and/or selectable filter having a matching value by a factor inverse to the first sampling rate;

for a second quantity of the first search results, sampling the second quantity of the first search results at the second sampling rate, thereby examining some search results in the second quantity while ignoring other search results in the second quantity, and for each examined search result in the second quantity, causing an increase in a facet count for a facet and/or selectable filter having a matching value in the examined search result in the first quantity of the first search results;

increasing the second facet count for the facet and/or selectable filter having the matching value by a factor inverse to the second sampling rate;

adding the first facet count to the second facet count to arrive at a final facet count for the facet and/or selectable filter having the matching value;

displaying, in the user interface, the final facet count for the facet and/or selectable filter having the matching value.

2. The computer-implemented method of claim 1, further comprising:

ordering the first search results based on a relevance scheme prior to the traversing.

3. The computer-implemented method of claim 2, further comprising:

receiving, via the user interface, a selection of a first facet;

altering the search query to reflect the selection of the first facet;

obtaining revised search results to the altered search query by applying the altered search query to the first results;

displaying, in the user interface, a second set of results from the revised search results;

traversing the revised search results using the sampling scheme, sampling search results for the first number of search results at the first sampling rate and sampling search results for the second number of search results at the second sampling rate, and for each sampled search result, causing an increase in a facet count for a facet other than the first facet and/or selectable filter other than a selectable filter corresponding to the first facet, having a matching value in the sampled search result;

displaying, in the user interface, updated facet counts for each of the facets and/or selectable filters, other than the first facet and selectable filters corresponding to the first facet.

4. The computer-implemented method of claim 3, further comprising ranking the revised search results based on a relevance scheme prior to the traversing the revised search results.

5. The computer-implemented method of claim 4, further comprising:

receiving, via the user interface, a selection of a second facet;

altering the search query to reflect the selection of the second facet;

obtaining additional revised search results to the altered search query reflecting selection of the second facet by applying the altered search query reflecting selection of the second facet to the revised search results;

displaying, in the user interface, a third set of results from the additional revised search results;

traversing the additional revised search results using the sampling scheme, sampling search results for the first number of search results at the first sampling rate and sampling search results for the second number of search results at the second sampling rate, and for each sampled search result, causing an increase in a facet count for a facet other than the first facet or second facet and/or selectable filter other than a selectable filter corresponding to the first facet or second facet, having a matching value in the sampled search result;

displaying, in the user interface, updated facet counts for each of the facets and/or selectable filters, other than the first facet and second facet and selectable filters corresponding to the first facet and second facet.

6. The computer-implemented method of claim 5, further comprising:

ranking the additional revised search results based on a relevance scheme prior to the traversing the additional revised search results.

7. The computer-implemented method of claim 3, further comprising:

updating the selectable filters displayed for a second facet based on the selection of the first facet.

8. The computer-implemented method of claim 7, wherein the updating the selectable filters includes displaying a preset number of selectable filters having corresponding values with the highest facet counts after the traversing the revised search results.

9. The computer-implemented method of claim 1, further comprising:

receiving, via the user interface, a selection of a first selectable filter of a first facet;

altering the search query to reflect the selection of the first selectable filter;

obtaining revised search results to the altered search query from the database;

displaying, in the user interface, a second set of results from the revised search results;

traversing the revised search results using the sampling scheme, sampling search results for the first number of search results at the first sampling rate and sampling search results for the second number of search results at the second sampling rate, and for each sampled search result, causing an increase in a facet count for a facet other than the first facet and/or selectable filter other than a selectable filter corresponding to the first facet, having a matching value in the sampled search result;

displaying, in the user interface, updated facet counts for each of the facets and/or selectable filters, other than the first facet and selectable filters corresponding to the first facet.

10. The computer-implemented method of claim 9, further comprising:

receiving, via the user interface, a selection of a second selectable filter of a second facet;

altering the search query to reflect the selection of the second selectable filter;

obtaining additional revised search results to the altered search query reflecting the selection of the second selectable filter from the database;

displaying, in the user interface, a third set of results from the additional revised search results;

traversing the revised search results using the sampling scheme, sampling search results for the first number of search results at the first sampling rate and sampling search results for the second number of search results at the second sampling rate, and for each sampled search result, causing an increase in a facet count for a facet other than the first facet and/or selectable filter other than a selectable filter corresponding to the first facet, having a matching value in the sampled search result;

displaying, in the user interface, updated facet counts for each of the facets and/or selectable filters, other than the first facet and selectable filters corresponding to the first facet.

11. The computer-implemented method of claim 1, further comprising:
retrieving one or more facet rules, each of the facet rules including a set of instructions that, when executed by a processor, affect alteration of the search query after selection, via the user interface, of one or more facets and/or selectable filters.

12. The computer-implemented method of claim 1, further comprising:
determining if the facet count for a facet is less than a predetermined threshold; and
in response to a determination that the facet count for a facet is less than the predetermined threshold, traversing the first search results one-by-one to obtain an exact facet count for the facet without sampling.

13. The computer-implemented method of claim 1, wherein the causing the increase in the facet count includes, based on a particular document, adding a facet count proportional to the sampling rate specified by the sampling scheme when the particular document is traversed.

14. A system comprising:
a computer-readable medium having instructions stored thereon, which, when executed by a processor, cause the system to:
receive, via a user interface, a search query;
obtain first search results to the search query from a database;
display, in the user interface, a first set of results from the first search results;
display, in the user interface, a plurality of facets of the first search results, each facet including one or more selectable filters, each facet corresponding to a different type of information in the first search results, and each selectable filter corresponding to a particular value for a type of information corresponding to its facet;
retrieve a sampling scheme, the sampling scheme defining a first sampling rate for a first quantity of a single set of search results and a second sampling rate for a second quantity of the single set of search results, the first sampling rate defining a first frequency at which search results are sampled and the second sampling rate defining a second frequency, different that the first frequency, at which search results are sampled, wherein sampling involves examining some search results in a given quantity while ignoring other search results in the given quantity;
for a first quantity of the first search results, sample the first quantity of the first search results at the first sampling rate, thereby examining some search results in the first quantity while ignoring other search results in the first quantity, and for each examined search result in the first quantity, causing an increase in a first facet count for a facet and/or selectable filter having a matching value in the examined search result in the first quantity of the first search results;

increase the first facet count for the facet and/or selectable filter having a matching value by a factor inverse to the first sampling rate;

for a second quantity of the first search results, sample the second quantity of the first search results at the second sampling rate, thereby examining some search results in the second quantity while ignoring other search results in the second quantity, and for each examined search result in the second quantity, causing an increase in a facet count for a facet and/or selectable filter having a matching value in the examined search result in the first quantity of the first search results;

increase the second facet count for the facet and/or selectable filter having the matching value by a factor inverse to the second sampling rate;

add the first facet count to the second facet count to arrive at a final facet count for the facet and/or selectable filter having the matching value;

display, in the user interface, the final facet count for the facet and/or selectable filter having the matching value.

15. The system of claim 14, further comprising the processor.

16. A non-transitory machine-readable storage medium having instruction data to cause a machine to perform the following operations:
receiving, via a user interface, a search query;
obtaining first search results to the search query from a database;
displaying, in the user interface, a first set of results from the first search results;
displaying, in the user interface, a plurality of facets of the first search results, each facet including one or more selectable filters, each facet corresponding to a different type of information in the first search results, and each selectable filter corresponding to a particular value for a type of information corresponding to its facet;
retrieving a sampling scheme, the sampling scheme defining a first sampling rate for a first quantity of a single set of search results and a second sampling rate for a second quantity of the single set of search results, the first sampling rate defining a first frequency at which search results are sampled and the second sampling rate defining a second frequency, different that the first frequency, at which search results are sampled, wherein sampling involves examining some search results in a given quantity while ignoring other search results in the given quantity;
for a first quantity of the first search results, sampling the first quantity of the first search results at the first sampling rate, thereby examining some search results in the first quantity while ignoring other search results in the first quantity, and for each examined search result in the first quantity, causing an increase in a first facet count for a facet and/or selectable filter having a matching value in the examined search result in the first quantity of the first search results;
increasing the first facet count for the facet and/or selectable filter having a matching value by a factor inverse to the first sampling rate;
for a second quantity of the first search results, sampling the second quantity of the first search results at the second sampling rate, thereby examining some search results in the second quantity while ignoring other search results in the second quantity, and for each examined search result in the second quantity, causing an increase in a facet count for a facet and/or selectable filter having a matching value in the examined search result in the first quantity of the first search results;

increasing the second facet count for the facet and/or selectable filter having the matching value by a factor inverse to the second sampling rate;

adding the first facet count to the second facet count to arrive at a final facet count for the facet and/or selectable filter having the matching value;

displaying, in the user interface, the final facet count for the facet and/or selectable filter having the matching value.

17. The non-transitory machine-readable storage medium of claim 16, further comprising:

receiving, via the user interface, a selection of a first facet;

altering the search query to reflect the selection of the first facet;

obtaining revised search results to the altered search query by applying the altered search query to the first results;

displaying, in the user interface, a second set of results from the revised search results;

traversing the revised search results using the sampling scheme, sampling search results for the first number of search results at the first sampling rate and sampling search results for the second number of search results at the second sampling rate, and for each sampled search result, causing an increase in a facet count for a facet other than the first facet and/or selectable filter other than a selectable filter corresponding to the first facet, having a matching value in the sampled search result;

displaying, in the user interface, updated facet counts for each of the facets and/or selectable filters, other than the first facet and selectable filters corresponding to the first facet.

18. The non-transitory machine-readable storage medium of claim 17, further comprising:

receiving, via the user interface, a selection of a first selectable filter of a first facet;

altering the search query to reflect the selection of the first selectable filter;

obtaining revised search results to the altered search query from the database;

displaying, in the user interface, a second set of results from the revised search results;

traversing the revised search results using the sampling scheme, sampling search results for the first number of search results at the first sampling rate and sampling search results for the second number of search results at the second sampling rate, and for each sampled search result, causing an increase in a facet count for a facet other than the first facet and/or selectable filter other than a selectable filter corresponding to the first facet, having a matching value in the sampled search result;

displaying, in the user interface, updated facet counts for each of the facets and/or selectable filters, other than the first facet and selectable filters corresponding to the first facet.

19. The non-transitory machine-readable storage medium of claim 17, further comprising:

receiving, via the user interface, a selection of a second facet;

altering the search query to reflect the selection of the second facet;

obtaining additional revised search results to the altered search query reflecting selection of the second facet by applying the altered search query reflecting selection of the second facet to the revised search results;

displaying, in the user interface, a third set of results from the additional revised search results;

traversing the additional revised search results using the sampling scheme, sampling search results for the first number of search results at the first sampling rate and sampling search results for the second number of search results at the second sampling rate, and for each sampled search result, causing an increase in a facet count for a facet other than the first facet or second facet and/or selectable filter other than a selectable filter corresponding to the first facet or second facet, having a matching value in the sampled search result;

displaying, in the user interface, updated facet counts for each of the facets and/or selectable filters, other than the first facet and second facet and selectable filters corresponding to the first facet and second facet.

20. The non-transitory machine-readable storage medium of claim 18, further comprising:

receiving, via the user interface, a selection of a second selectable filter of a second facet;

altering the search query to reflect the selection of the second selectable filter;

obtaining additional revised search results to the altered search query reflecting the selection of the second selectable filter from the database;

displaying, in the user interface, a third set of results from the additional revised search results;

traversing the revised search results using the sampling scheme, sampling search results for the first number of search results at the first sampling rate and sampling search results for the second number of search results at the second sampling rate, and for each sampled search result, causing an increase in a facet count for a facet other than the first facet and/or selectable filter other than a selectable filter corresponding to the first facet, having a matching value in the sampled search result;

displaying, in the user interface, updated facet counts for each of the facets and/or selectable filters, other than the first facet and selectable filters corresponding to the first facet.

* * * * *

UNITED STATES PATENT AND TRADEMARK OFFICE
CERTIFICATE OF CORRECTION

Page 1 of 2

PATENT NO. : 10,795,894 B2
APPLICATION NO. : 14/813030
DATED : October 6, 2020
INVENTOR(S) : Sankar et al.

It is certified that error appears in the above-identified patent and that said Letters Patent is hereby corrected as shown below:

In the Claims

In Column 22, Line 5-29, in Claim 19, delete:
"19. The non-transitory machine-readable storage medium of claim 17, further comprising:
receiving, via the user interface, a selection of a second facet;
altering the search query to reflect the selection of the second facet;
obtaining additional revised search results to the altered search query reflecting selection of the second facet by applying the altered search query reflecting selection of the second facet to the revised search results;
displaying, in the user interface, a third set of results from the additional revised search results;
traversing the additional revised search results using the sampling scheme, sampling search results for the first number of search results at the first sampling rate and sampling search results for the second number of search results at the second sampling rate, and for each sampled search result, causing an increase in a facet count for a facet other than the first facet or second facet and/or selectable filter other than a selectable filter corresponding to the first facet or second facet, having a matching value in the sampled search result;
displaying, in the user interface, updated facet counts for each of the facets and/or selectable filters, other than the first facet and second facet and selectable filters corresponding to the first facet and second facet."
And insert:
--19. The non-transitory machine-readable storage medium of claim 18, further comprising:
receiving, via the user interface, a selection of a second selectable filter of a second facet;
altering the search query to reflect the selection of the second selectable filter;
obtaining additional revised search results to the altered search query reflecting the selection of the second selectable filter from the database;
displaying, in the user interface, a third set of results from the additional revised search results;
traversing the revised search results using the sampling scheme, sampling search results for the first number of search results at the first sampling rate and sampling search results for the second number of search results at the second sampling rate, and for each sampled search result, causing an increase in a facet count for a facet other than the first facet and/or selectable Signed and Sealed this
Nineteenth Day of October, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,795,894 B2 filter other than a selectable filter corresponding to the first facet, having a matching value in the sampled search result;
displaying, in the user interface, updated facet counts for each of the facets and/or selectable filters, other than the first facet and selectable filters corresponding to the first facet.-- therefor In Column 22, Line 30-54, in Claim 20, delete:
"20. The non-transitory machine-readable storage medium of claim 18, further comprising:
receiving, via the user interface, a selection of a second selectable filter of a second facet;
altering the search query to reflect the selection of the second selectable filter;
obtaining additional revised search results to the altered search query reflecting the selection of the second selectable filter from the database;
displaying, in the user interface, a third set of results from the additional revised search results;
traversing the revised search results using the sampling scheme, sampling search results for the first number of search results at the first sampling rate and sampling search results for the second number of search results at the second sampling rate, and for each sampled search result, causing an increase in a facet count for a facet other than the first facet and/or selectable filter other than a selectable filter corresponding to the first facet, having a matching value in the sampled search result;
displaying, in the user interface, updated facet counts for each of the facets and/or selectable filters, other than the first facet and selectable filters corresponding to the first facet."
And insert:
--20. The non-transitory machine-readable storage medium of claim 17, further comprising:
receiving, via the user interface, a selection of a second facet;
altering the search query to reflect the selection of the second facet;
obtaining additional revised search results to the altered search query reflecting selection of the second facet by applying the altered search query reflecting selection of the second facet to the revised search results;
displaying, in the user interface, a third set of results from the additional revised search results;
traversing the additional revised search results using the sampling scheme, sampling search results for the first number of search results at the first sampling rate and sampling search results for the second number of search results at the second sampling rate, and for each sampled search result, causing an increase in a facet count for a facet other than the first facet or second facet and/or selectable filter other than a selectable filter corresponding to the first facet or second facet, having a matching value in the sampled search result;
displaying, in the user interface, updated facet counts for each of the facets and/or selectable filters, other than the first facet and second facet and selectable filters corresponding to the first facet and second facet.-- therefor